Jan. 26, 1971  R. H. HOMSTEAD  3,557,639
IN-MOTION VERNIER FEED CONTROL
Filed Feb. 3, 1969
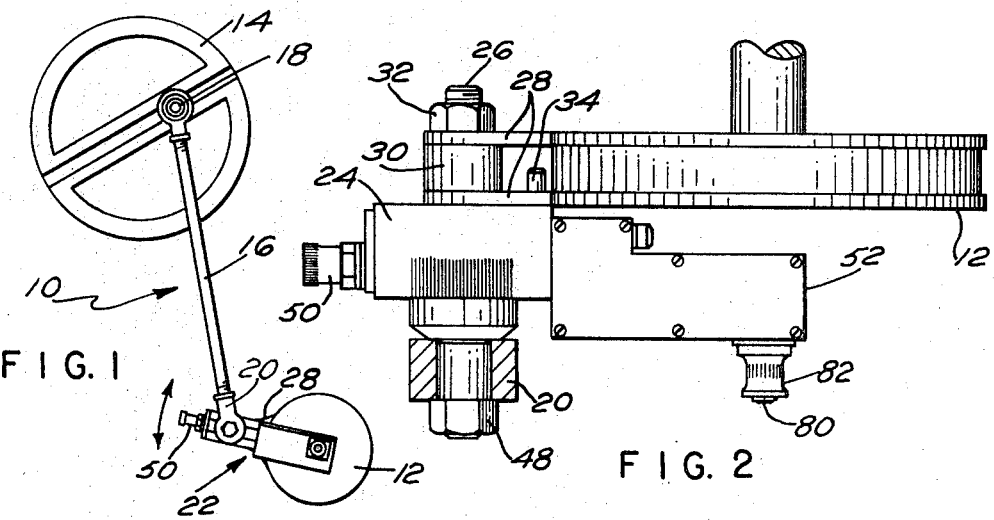
FIG. 1
FIG. 2
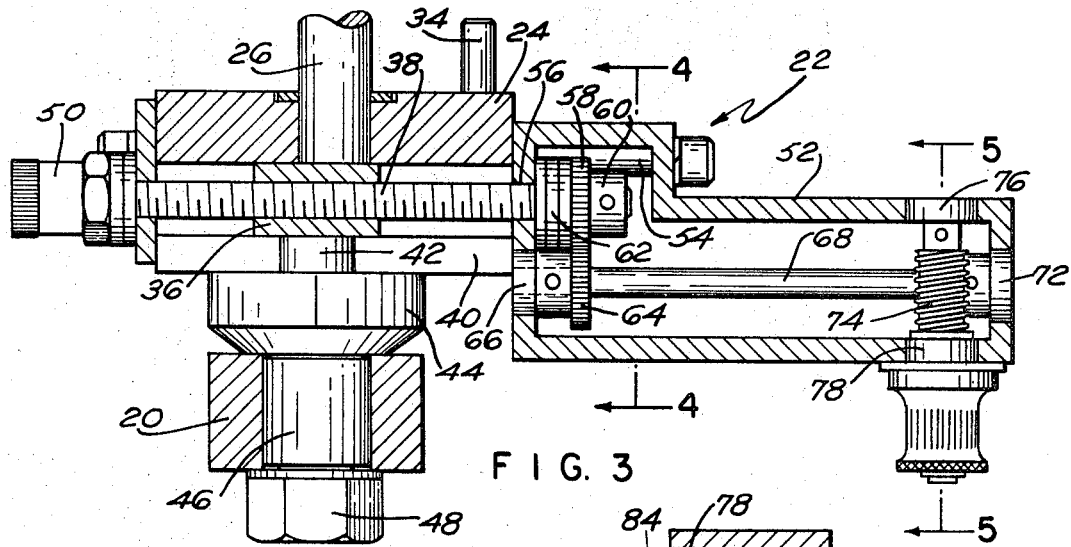
FIG. 3
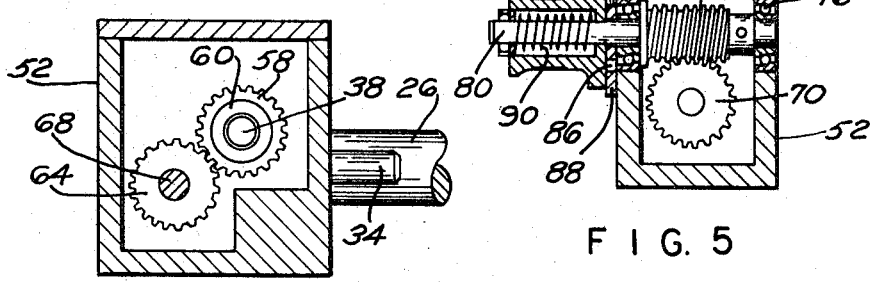
FIG. 4
FIG. 5
INVENTOR
ROBERT H. HOMSTEAD
BY *Salter & Michaelson*
ATTORNEYS United States Patent Office 3,557,639
Patented Jan. 26, 1971

3,557,639
IN-MOTION VERNIER FEED CONTROL
Robert H. Homstead, Greenville, R.I., assignor to Carl G. Peterson Co., Smithfield, R.I., a corporation of Rhode Island
Filed Feb. 3, 1969, Ser. No. 796,086
Int. Cl. F16h *35/00;* G05g *1/00*
U.S. Cl. 74—841                 4 Claims

ABSTRACT OF THE DISCLOSURE

A vernier control for feed mechanisms used in the feed of sheet stock and the like, said control having means for making fine adjustments in the feed stroke while the feed mechanism is in full operation.

BACKGROUND OF THE INVENTION

This invention relates generally to feed controls of the type disclosed in U.S. Pat. No. 2,852,285. More specifically, this invention is concerned with close tolerance feeding on any type of roll feed wherein sheet stock is fed intermittently by the mechanism and wherein the precise amount of stock that is fed during each feed operation is highly critical.

In Pat. No. 2,852,285 a feed control is shown wherein a fine adjustment may be made but wherein the feed mechanism must be shut down and stopped in order for the desired adjustment to be effected. This is because the actuating means which must be manipulated to effect the desired adjustment is in motion when the feed mechanism is in motion; and since feed mechanism of this type operates with great rapidity, i.e., sometimes as many as 1250 feed strokes per minute, it follows that it is physically impossible to manipulate the rapidly moving actuating means to effect the desired adjustment of the feed stroke without completely stopping the feed mechanism.

The disadvantages of having to completely stop the feed mechanism to effect the desired fine adjustment are thought to be obvious. Primarily, by being able to make a fine adjustment while the feed mechanism is in full motion, the desired adjustment may be made without a lengthy trial and error procedure. More specifically, when the feed mechanism is operating, and particularly at speeds of more than 400 strokes per minute, it is impossible to predetermine exactly what the length of the feed stroke will be as a result of variables due to inertia and the like. Thus, when the mechanism is at a complete stop, one would have no way of determining just what fine adjustment should be made without going through a lengthy trial and error procedure. This problem is obviously overcome by making the fine adjustment when the mechanism is in full motion, because now the operator can visually determine when the proper adjustment has been made by actual inspection of the stock being fed. Thus, by being able to make this fine adjustment while the feed mechanism is in full motion, not only is substantial time saved, which means increased production, but also a more accurate fine adjustment can be made than where the machine has to be completely shut down to make the desired adjustment.

SUMMARY OF THE INVENTION

It is therefore a primary object of the instant invention to provide control means for effecting fine adjustment of the feed stroke on roll feed apparatus wherein the fine adjustment may be made without any disruption or slowing down of the feed operation.

Another object is the provision of a feed control of the character described wherein fine adjustment of the feed stroke may be made while the feed mechanism is in full operation and at a location remote from the feed mechanism.

A further object is the provision of a feed control having built-in locking means for insuring that the feed stroke will remain constant until a fine adjustment is desired and made.

Other objects, features and advantages of the invention will become obvious as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a side elevational view of a stock feed assembly embodying the instant invention;

FIG. 2 is a top plan view of the vernier feed control and the oscillating feed member to which it is attached;

FIG. 3 is a sectional view of the vernier feed control per se;

FIG. 4 is a section taken on line 4—4 of FIG. 3; and

FIG. 5 is a section taken on line 5—5 of FIG. 3.

DESCRIPTION OF THE INVENTION

Referring now to the drawings, and more particularly to FIG. 1, there is shown generally at 10 a feed assembly comprising an oscillatory feed member 12 which may comprise any suitable mechanism for effecting feed of sheet stock or the like responsive to rotation of the member 12 in one direction. Thus, the member 12 may be a multipawl feed mechanism of the type shown in U.S. Pat. No. 2,591,993 or any other suitable or similar mechanism. In order to impart oscillation to the feed member 12, a wheel 14 is provided having a crank arm 16 eccentrically mounted with respect thereto, as shown at 18. The opposite end 20 of crank arm 16 is pivotally connected to a vernier feed control device identified generally as 22, which device in turn is connected to the feed member 12. It will thus be obvious that rotation of wheel 14 will impart reciprocal movement to crank arm 16, which in turn will cause oscillation of feed member 12, all in a manner well known in the art. It will further be obvious that the length of the stroke of crank arm 16, and hence the degree of oscillating movement of member 12, is determined by the distance that connection 18 is located from the center of wheel 14. More specifically, the stroke of crank 16 and feed member 12 may be increased by increasing the eccentricity of connection 18 with respect to wheel 14 and vice versa.

As was pointed out in considerable detail in U.S. Pat. No. 2,852,285, the above discussed adjustment of the feed stroke by relocation of connection 18 with respect to the center of wheel 14 is insufficient for making a truly fine adjustment of the feed stroke. Such a fine adjustment is frequently both desirable and necessary, and hence the vernier feed control illustrated and disclosed in U.S. Pat. No. 2,852,285 was developed. Basically, and expressed simply, this vernier feed control effects the desired fine adjustment by varying the distance between the connection 20 and the center of the disc 12. As explained in U.S. Pat. No. 2,852,285, and for the reasons set forth therein, varying this spacing results in corresponding variation of the feed stroke. The vernier control of the instant invention operates in an identical manner to the operation of the vernier feed control in U.S. Pat. No. 2,852,285; but whereas the latter cannot be operated when the feed mechanism is in full operation, the instant invention includes means for permitting operation of the vernier control while the feed mechanism is in full operation.

The vernier control 22 comprises a housing 24 having a fixed shaft 26 extending outwardly therefrom, which shaft extends through aligned openings in offset portions 28 located at a point on the periphery of feed disc 12. A spacing collar 30 surrounds shaft 26 and is located between portions 28, and a nut 32 engages the threaded end of shaft 26 to securely connect the vernier control to the feed disc 12. Secured to housing 24 and extending outwardly therefrom in a direction substantially parallel to shaft 26 is a locking pin 34 which extends through a suitable aperture in one of the portions 28 in order to lock the vernier control 22 against rotation with respect to feed disc 12 and at the same time maintain the vernier control radially disposed with respect to disc 12, for reasons hereinafter to be made apparent.

Snugly mounted within housing 24 is a block 36 that is threadedly engaged to a threaded rod 38 which is mounted for rotation in housing 24. Since the block 36 is not free to rotate within housing 24, it follows that rotation of rod 38 will result in longitudinal movement of block 36 with respect to rod 38. Secured to block 36 and extending outwardly through a longitudinal slot 40 provided in housing 24 is a shaft 42 which has fixedly mounted thereon a circular collar 44 which in turn merges with enlarged portion 46 which pivotally receives therearound the eye portion of connector 20, which connector is maintained against displacement from the shaft by means of nut 48 which threadedly engages the outer extremity of shaft 42.

It will therefore be seen that reciprocation of crank arm 16 imparts oscillatory movement to vernier control 22 and hence to feed disc 12 about the center of rotation of the latter. It will further be seen that rotation of rod 38 will cause longitudinal movement of block 36 and hence shaft 42 carried thereby, thus varying the radial distance between the center of the eye in connector 20 and the center of disc 12. As previously explained, and as explained in detail in U.S. Pat. No. 2,852,285, variations in this radial distance result in corresponding variations in the feed stroke.

Up to this point, the instant invention is identical in all salient respects to that disclosed in U.S. Pat. No. 2,852,285. In the latter arrangement, however, the rod 38 is rotated by an adjusting nut 50 located outside of the housing 24 in alignment with the rod 38. When the feed mechanism is in operation, it will be obvious that the nut 50 will be in motion, thus preventing operation of the vernier control 22 until the feed mechanism has been stopped. In order to overcome this disadvantage, the instant invention embodies a second housing 52 secured to housing 24 by any suitable means, such as bolts 54. Housing 52 is provided with a suitable opening 56 for receiving therethrough the end of rod 38, on which is mounted a gear 58, said gear being maintained in proper position by a locking collar 60 and spacers 62. Drivingly engaged with gear 58 is a second gear 64 journaled in housing 52 as at 66. Gear 64 is fixedly secured to shaft 68, which at its opposite extremity carries gear 70 journaled in the opposite end wall of housing 52 as at 72. Drivingly engaged with gear 70 is a worm gear 74 rotatably mounted in the housing 52 and journaled therein as at 76 and 78. Secured to worm gear 74 for rotation therewith is a shaft 80 that extends outwardly of housing 52, whereupon rotation of the shaft 80 results in rotation of worm gear 74, which through gear 70 drives shaft 68, which in turn, through gears 64 and 58, imparts rotation to rod 38.

In order to facilitate rotation of shaft 80, a handle 82 is mounted thereon, said handle being keyed to shaft 80 for rotation therewith. Although the handle 82 is not rotatable with respect to shaft 80, it is axially movable with respect thereto as a part of means for effecting locking of shaft 80 against inadvertent and undesirable rotation. More specifically, handle 82 is provided with a pin 84 that is adapted to engage within a series of holes 86 located concentrically around the axis of shaft 80 in a plate 88 secured to the outer surface of housing 52. Resilient means 90 in the form of a coil spring is mounted on shaft 80 and normally urges handle 82 toward housing 52 so that pin 84 will normally be engaged in one of the openings 86, as shown in FIG. 5. In this position, shaft 80 and handle 82 are locked against rotation; but when it is desired to rotate the handle 82 and shaft 80, it is simply necessary to pull outwardly on handle 82 against the action of spring 90 until pin 84 clears plate 88 and the apertures 86 therein, at which point shaft 80 is free for rotation, and the desired adjustment of shaft 42 may be effected through the gearing arrangement previously described.

As previously stated, the vernier control 22 is mounted to feed disc 12 so as to be radially disposed with respect thereto, this being essential so that shaft 80 may be aligned with the center of disc 12, as illustrated in FIGS. 1 and 2. By aligning the shaft 80 with the center of disc 12, it will be apparent that since the vernier control is oscillating about the center of disc 12, there will be no movement of shaft 80 and handle 82 other than oscillatory movement about their own axis. Thus, the handle 82 may be easily grasped, unlocked, and manipulated to turn shaft 80 to effect the desired fine adjustment of the feed stroke even while the feed mechanism is in full-scale operation. If desired, flexible cable means (not shown) could be attached to shaft 80 to effect turning movement thereof from a remote location.

What is claimed is:

1. In a feed mechanism comprising a member which oscillates about a center of rotation, reciprocable crank means connected to said member at a point spaced from said center for imparting oscillatory movement thereto, a vernier control for adjusting the degree of oscillatory movement of said member without changing the length of stroke of said crank, said control comprising a housing which interconnects said crank and said oscillatory member, said housing being connected to said member at said aforesaid off-center point, and extending radially to a position overlying said center of rotation, means locking said housing to said member for oscillatory movement therewith, a shaft extending from said housing in a direction substantially parallel to the axis of rotation of said member, said crank means being pivotally connected to said shaft, means in said housing for adjusting the position of said shaft to vary the distance between said shaft and said center of rotation, and actuating means extending from said housing for controlling said adjusting means, said actuating means being located in substantial alignment with said center of rotation, whereby said actuating means may be manipulated while the feed mechanism is in operation.

2. In the feed mechanism of claim 1, said actuating means comprising a rotatable shaft, and means normally locking said rotatable shaft against rotation.

3. In the feed mechanism of claim 1, said actuating means comprising a rotatable shaft, a handle on said shaft outside said housing, said handle being keyed to said shaft for rotation therewith but being axially slidable with respect thereto, said handle having a locking pin extending toward said housing, and said housing having a plurality of apertures for receiving said pin to lock said handle and shaft against rotation, and resilient means normally urging said handle into locking engagement with said housing.

4. In the feed mechanism of claim 1, said adjusting means comprising a threaded rod mounted for rotation in said housing, a block threadedly engaged on said rod whereby rotation of said rod causes longitudinal movement of said block therealong, said shaft being fixed to said block for movement therewith, and a gear assembly interconnecting said actuating means and said rod, whereby manipulation of the former causes rotation of the latter.

References Cited

UNITED STATES PATENTS

| | | | |
|---|---|---|---|
| 3,055,595 | 9/1962 | Bohn et al. | 74—600 |
| 3,105,639 | 10/1963 | Jepson | 74—600 |
| 3,115,599 | 12/1963 | Ziegler | 74—600 |
| 3,161,067 | 12/1964 | Möller | 74—600 |
| 3,188,873 | 6/1965 | Vowell et al. | 74—600 |

FRED C. MATTERN, Jr., Primary Examiner

W. S. RATLIFF, Jr., Assistant Examiner

U.S. Cl. X.R.

74—600